(12) United States Patent
Chinthu

(10) Patent No.: US 11,569,738 B1
(45) Date of Patent: Jan. 31, 2023

(54) MULTI-STAGE CHARGE PUMP WITH CLOCK-CONTROLLED INITIAL STAGE AND SHIFTED CLOCK-CONTROLLED ADDITIONAL STAGE

(71) Applicant: GLOBALFOUNDRIES U.S. Inc., Malta, NY (US)

(72) Inventor: Siva K. Chinthu, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/488,380

(22) Filed: Sep. 29, 2021

(51) Int. Cl.
*H02M 3/07* (2006.01)

(52) U.S. Cl.
CPC ............. *H02M 3/071* (2021.05); *H02M 3/07* (2013.01); *H02M 3/073* (2013.01); *H02M 3/076* (2021.05); *H02M 3/077* (2021.05)

(58) Field of Classification Search
CPC ..................................................... H02M 3/076
See application file for complete search history.

(56) References Cited

U.S. PATENT DOCUMENTS

| | | | | |
|---|---|---|---|---|
| 4,149,232 A * | 4/1979 | Eaton, Jr. | ............... | H02M 7/537 363/60 |
| 5,059,815 A | 10/1991 | Bill et al. | | |
| 5,734,286 A * | 3/1998 | Takeyama | .......... | H03K 5/15013 327/295 |
| 6,028,473 A | 2/2000 | Kamei et al. | | |
| 6,046,626 A * | 4/2000 | Saeki | .................... | H02M 3/073 327/536 |
| 6,160,723 A * | 12/2000 | Liu | ........................ | H02M 3/073 363/60 |
| 6,191,963 B1 * | 2/2001 | McPartland | .......... | H02M 3/073 307/111 |
| 6,356,469 B1 * | 3/2002 | Roohparvar | .......... | H02M 3/073 363/60 |
| 6,483,728 B1 * | 11/2002 | Johnson | ................ | H02M 3/073 363/60 |
| 6,525,949 B1 * | 2/2003 | Johnson | ................ | H02M 3/073 363/60 |

(Continued)

OTHER PUBLICATIONS

Pelliconi et al., "Power Efficient Charge Pump in Deep Submicron Standard CMOS Technology," IEEE Journal of Solid-State Circuits, vol. 38, No. 6, 2003, pp. 1068-1071.

(Continued)

*Primary Examiner* — Thomas J. Hiltunen
(74) *Attorney, Agent, or Firm* — David Cain; Hoffman Warnick LLC

(57) ABSTRACT

Disclosed is a multi-stage charge pump. A first stage is controlled by a first clock signal. A second stage is controlled by a second clock signal, which has high and low states that are shifted relative to the high and low states of the first clock signal. The high and low states of the second clock signal can be higher than the high and low states, respectively, of the first clock signal for a positive charge pump and vice versa for a negative charge pump. Any additional stage is similarly controlled by an additional clock signal that is shifted with respect to the clock signal controlling the immediately preceding stage. By shifting the high and low states of clock signals controlling downstream stages, the need for series-connected or high voltage capacitors in the downstream stages is eliminated and circuit complexity and area consumption are reduced.

15 Claims, 9 Drawing Sheets

(56) References Cited

U.S. PATENT DOCUMENTS

| | | | |
|---|---|---|---|
| 6,570,434 B1 | 5/2003 | Hsu et al. | |
| 6,819,162 B2 | 11/2004 | Pelliconi | |
| 6,995,603 B2* | 2/2006 | Chen | H02M 3/073 |
| | | | 363/60 |
| 7,116,156 B2* | 10/2006 | Myono | H02M 3/073 |
| | | | 327/536 |
| 8,476,963 B2* | 7/2013 | Cook | H02M 3/07 |
| | | | 363/60 |
| 9,013,229 B2* | 4/2015 | Rahman | H02M 3/073 |
| | | | 327/536 |
| 9,548,655 B2* | 1/2017 | Ersoy | H02M 3/073 |
| 2010/0327959 A1* | 12/2010 | Lee | H02M 3/07 |
| | | | 327/536 |

OTHER PUBLICATIONS

Ballo et al., "A Review of Charge Pump Topologies for the Power Management of IoT Nodes," MDPI Electronics, 8, 480, 2019, pp. 1-15.

Cavalheiro et al., "Insights into Tunnel FET-Based Charge-Pumps and Rectifiers for Energy Harvesting Applications," IEEE Transactions on Very Large Scale Integration (VLSI) Systems, vol. 25, Issue 3, 2017, pp. 1-11.

\* cited by examiner

MULTI-STAGE CHARGE PUMP WITH CLOCK-CONTROLLED INITIAL STAGE AND SHIFTED CLOCK-CONTROLLED ADDITIONAL STAGE

BACKGROUND

Field of the Invention

The present invention relates to charge pumps and, more particularly, to embodiments of a reliability improved and area efficient charge pump.

Description of Related Art

Modern integrated circuit designs often require higher positive or negative voltages than the available positive and negative supply voltages (e.g., Vdd and GND, respectively). Typically, a multi-stage positive charge pump is used to generate relatively high positive voltages and, particularly, positive voltages that are greater than Vdd (e.g., positive voltages of 2*Vdd, 3*Vdd, etc.). Similarly, a multi-stage negative charge pump is used to generate relatively high negative voltages (e.g., negative voltages of −1*Vdd, −2*Vdd, etc.). However, within such multi-stage charge pumps, each higher (i.e., downstream) stage requires a greater number of capacitors (e.g., more series-connected capacitors) or a higher voltage capacitor than the previous stage. Additionally, multi-stage positive and negative charge pumps that employ series-connected capacitors in the downstream stages, require biasing of internal capacitor nodes. As a result, such multi-stage positive and negative charge pumps are relatively complex and consume a significant amount of chip area.

SUMMARY

In view of the foregoing, disclosed herein are embodiments of a reliability improved and area efficient multi-stage charge pump. In each of the disclosed embodiments, the charge pump can include multiple stages (e.g., a first stage, a second stage, and optionally one or more additional stages). The first stage can be clock-controlled (e.g., controlled by a first clock signal) and can output a first output voltage in response to an input voltage. The second stage can be shifted clock-controlled (e.g., controlled by a second clock signal that has been shifted relative to the first clock signal). Specifically, the second clock signal can have the same amplitude as the first clock signal but the high and low states of the second clock signal can be shifted relative to the high and low states of the first clock signal. For example, the high and low states of the second clock signal can be higher than the high and low states of the first clock signal for a positive charge pump and vice versa for a negative charge pump. In any case, the second stage can output a second output voltage in response to the first output voltage received from the first stage. Similarly, any additional stage can be shifted clock-controlled (e.g., controlled by an additional clock signal that is shifted with respect to the clock signal that controlled the immediately preceding stage). By shifting the high and low states of the clock signals that control downstream stages within the multi-stage charge pump instead of using the same clock signal for all stages, the embodiments eliminate that need for series-connected or high voltage capacitors in the downstream stages and thereby reduce circuit complexity and chip area consumption while also improving reliability.

More particularly, disclosed herein are embodiments of a multi-stage charge pump. In each of the embodiments, the charge pump can include a first stage. The first stage can be configured to receive an input voltage and a first clock signal, which has first high and low states. The first stage can further be configured to output a first output voltage in response to the input voltage and first clock signal. The first output voltage can have a greater absolute value than the input voltage. In each of the embodiments, the charge pump can further include a clock signal shift circuit. The clock signal shift circuit can be configured to receive the input voltage and the first clock signal. The clock signal shift circuit can further be configured to output a second clock signal, which has second high and low states that are different from the first high and low states, in response to the input voltage and the first clock signal. As discussed in greater detail below, the second high and low states of the second clock signal can be shifted higher than the first high and low states of the first clock signal in the case of a positive charge pump and lower than the first high and low stages of the first clock signal in the case of a negative charge pump. In any case, the charge pump can further include a second stage. The second stage can be configured to receive the first output voltage from the first stage and the second clock signal from the clock signal shift circuit. The second stage can further be configured to output a second output voltage with a greater absolute value than the first output voltage in response to the first output voltage and the second clock signal.

Some embodiments disclosed herein include a multi-stage positive charge pump. The multi-stage positive charge pump can include an inverter. The inverter can be configured to receive a first clock signal, which has first high and low states. The inverter can further be configured to output an inverted first clock signal in response to the first clock signal. The multi-stage positive charge pump can further include a first stage. The first stage can be configured to receive a positive input voltage, the first clock signal, and the inverted first clock signal. The first stage can further be configured to output a first positive output voltage that is greater than the positive input voltage in response to the positive input voltage, the first clock signal, and the inverted first clock signal. The multi-stage positive charge pump can further include a clock signal shift circuit. The clock signal shift circuit can be configured to receive the positive input voltage, the first clock signal, and the inverted first clock signal. The clock signal shift circuit can further be configured to output, in response to the positive input voltage, the first clock signal, and the inverted first clock signal, a second clock signal, which has second high and low states that are different from the first high and low states and, more particularly, which are shifted higher than the first high and low states, respectively, and an inverted second clock signal. The multi-stage positive charge pump can further include a second stage. The second stage can be configured to receive the first positive output voltage, the second clock signal, and the inverted second clock signal. The second stage can further be configured to output a second positive output voltage, which is greater than the first positive output voltage, in response to the first positive output voltage, the second clock signal, and the inverted second clock signal.

Some embodiments disclosed herein include a multi-stage negative charge pump. The multi-stage negative charge pump can include an inverter. The inverter can be configured to receive a first clock signal, which has first high and low states. The inverter can further be configured to output an inverted first clock signal in response to the first clock signal. The multi-stage negative charge pump can further include a first stage. The first stage can be configured to receive an input voltage of 0 volts, the first clock signal, and the inverted first clock signal. The first stage can further be configured to output a first negative output voltage in response to the input voltage, the first clock signal, and the inverted first clock signal. The multi-stage negative charge pump can further include a clock signal shift circuit. The clock signal shift circuit can be configured to receive the input voltage, the first clock signal, and the inverted first clock signal. The clock signal shift circuit can further be configured to output, in response to the input voltage, the first clock signal, and the inverted first clock signal, a second clock signal, which has second high and low states that are different from the first high and low states and, more particularly, which are shifted lower than the first high and low states, respectively, and an inverted second clock signal. The multi-stage negative charge pump can further include a second stage. The second stage can be configured to receive the first negative output voltage, the second clock signal, and the inverted second clock signal. The second stage can further be configured to output a second negative output voltage, which is less than the first negative output voltage, in response to the first negative output voltage, the second clock signal, and the inverted second clock signal.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, modern integrated circuit designs often require higher positive or negative voltages than the available positive and negative supply voltages (e.g., Vdd and GND, respectively). Typically, a multi-stage positive charge pump is used to generate relatively high positive voltages and, particularly, positive voltages greater than Vdd (e.g., positive voltages of 2*Vdd, 3*Vdd, etc.). Similarly, a multi-stage negative charge pump is used to generate relatively high negative voltages (e.g., negative voltages of −1*Vdd, −2*Vdd, etc.). However, within such multi-stage charge pumps, each higher (i.e., downstream) stage requires a greater number of capacitors (e.g., more series-connected capacitors) or a higher voltage capacitor than the previous stage. Additionally, multi-stage positive and negative charge pumps that employ series-connected capacitors in the downstream stages, require biasing of internal capacitor nodes. As a result, such multi-stage positive and negative charge pumps are relatively complex and consume a significant amount of chip area.

In view of the foregoing, disclosed herein are embodiments of a reliability improved and area efficient multi-stage charge pump. In each of the disclosed embodiments, the charge pump can include multiple stages (e.g., a first stage, a second stage, and optionally one or more additional stages). The first stage can be clock-controlled (e.g., controlled by a first clock signal) and can output a first output voltage in response to an input voltage. The second stage can be shifted clock-controlled (e.g., controlled by a second clock signal that has been shifted relative to the first clock signal). Specifically, the second clock signal can have the same amplitude as the first clock signal but the high and low states of the second clock signal can be shifted relative to the high and low states of the first clock signal. For example, the high and low states of the second clock signal can be higher than the high and low states of the first clock signal for a positive charge pump and vice versa for a negative charge pump. In any case, the second stage can output a second output voltage in response to the first output voltage received from the first stage. Similarly, any additional stage can be shifted clock-controlled (e.g., controlled by an additional clock signal that is shifted with respect to the clock signal that controlled the immediately preceding stage). By shifting the high and low states of the clock signals that control downstream stages within the multi-stage charge pump instead of using the same clock signal for all stages, the embodiments eliminate that need for series-connected or high voltage capacitors in the downstream stages and thereby reduce circuit complexity and chip area consumption while also improving reliability.

Figure 1:
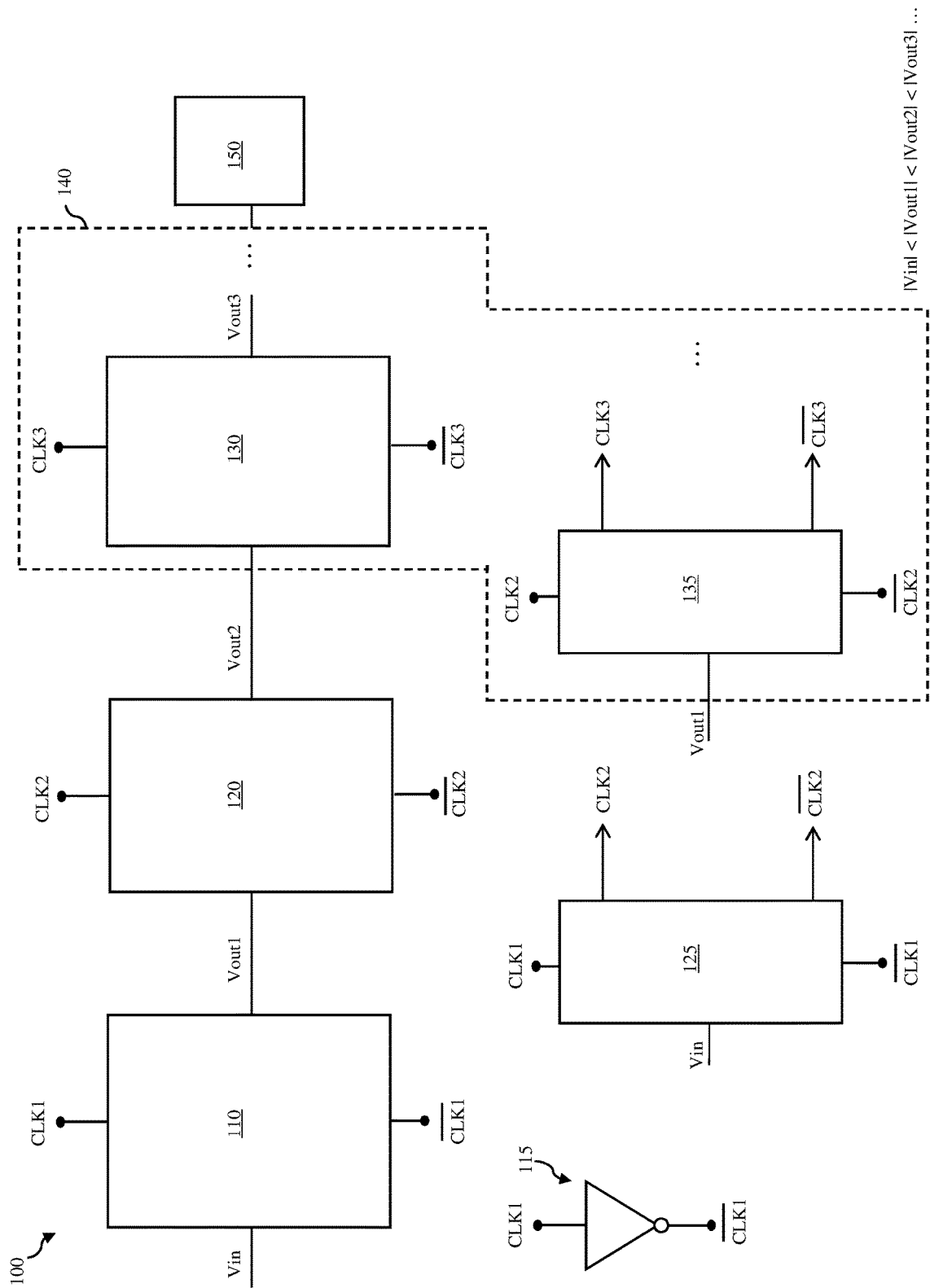
FIG. 1 is a schematic diagram illustrating disclosed embodiments of a multi-stage charge pump.

More particularly, referring to FIG. 1, disclosed herein are embodiments of a multi-stage charge pump 100. The charge pump 100 can be a positive charge pump that generates relatively high positive voltages and, particularly, positive voltages that are greater than Vdd (e.g., positive voltage of 2*Vdd, 3*Vdd, etc.). Alternatively, the charge pump 100 can be a negative charge pump that generates relatively high negative voltages (e.g., negative voltages of −1*Vdd, −2*Vdd, etc.).

In any case, the charge pump 100 can include a first stage 110 and an inverter 115. The inverter 115 can be configured to receive a first clock signal (CLK1) (e.g., from a conventional clock generation circuit). CLK1 can oscillate between first high and low states. In some embodiments the first high state can be at a positive supply voltage level (e.g., at Vdd) and the first low state can be at ground (e.g., at 0 volts). The inverter 115 can further be configured to invert CLK1, outputting an inverted first clock signal (CLK1b) in response to the first clock signal. Thus, when CLK1 is at the first high state (e.g., at Vdd), CLK1b will be at the first low state (e.g., 0 volts) and vice versa. The first stage 110 can be configured to receive an input voltage (Vin) at a voltage input node. For example, in the case of a positive charge pump Vin can be at the positive supply voltage level (e.g., at Vdd); whereas in the case of a negative charge pump Vin can be at ground (e.g., at 0 volts). The first stage 110 can further be configured to receive CLK1 and CLK1*b*. The first stage 110 can further be configured to, in response to the Vin, CLK1 and CLK1*b*, output a first output voltage (Vout1) at a voltage output node. Vout1 can have a greater absolute value than the Vin. For example, in the case of a positive charge pump where Vin is Vdd, Vout1 can be at two times the positive supply voltage level (i.e., at 2*Vdd); whereas in the case of a negative charge pump where Vin is at 0 volts, Vout1 can be at negative one times the positive supply voltage level (i.e., at −1*Vdd).

The charge pump 100 can further include a first clock signal shift circuit 125 and a second stage 120. The first clock signal shift circuit 125 can be configured to receive Vin, CLK1, and CLK1*b*. The first clock signal shift circuit 125 can further be configured to output a second clock signal (CLK2) and an inverted second clock signal (CLK2bar) in response to Vin, CLK1 and CLK1*b*. Specifically, the first clock signal shift circuit 125 can be configured to generate a CLK2, which oscillates between second high and low states that are different from the first high and low states, respectively, of CLK1. In the case of a positive charge pump CLK2 can be shifted with respect to CLK1 such that the second high and low states are higher than the first high and low states, respectively (e.g., such that the second high and low states are at 2*Vdd and Vdd, respectively, as opposed to Vdd and 0 volts, respectively); whereas in the case of a negative charge pump CLK2 can be shifted with respect to CLK1 such that the second high and low states are lower than the first high and low states, respectively (e.g., such that the second high and low states are at 0 volts and −1*Vdd, respectively, as opposed to Vdd and 0 volts, respectively). In any case, the first clock signal shift circuit 125 can be configured so that, when CLK2 is at the second high state, CLK2*b* will be at the second low state and vice versa. The second stage 120 can be configured to receive Vout1 from the first stage 110 at a voltage input node. The second stage 120 can further be configured to receive CLK2 and CLK2*b* from the first clock signal shift circuit 125. The second stage 120 can further be configured to, in response to Vout1, CLK2, and CLK2bar, output a second output voltage (Vout2) at a voltage output node. Vout2 can have a greater absolute value than Vout1. For example, in the case of a positive charge pump where Vout1 is 2*Vdd, Vout2 can be at three times the positive supply voltage level (i.e., at 3*Vdd); whereas in the case of a negative charge pump where Vout1 is at −1*Vdd, Vout2 can be at negative two times the positive supply voltage level (i.e., at −2*Vdd).

Optionally, the charge pump 100 can further include one or more additional downstream stages and the corresponding clock signal shift circuits 140.

For example, optionally, the charge pump 100 can further include a second clock signal shift circuit 135 and a third stage 130. The second clock signal shift circuit 135 can be configured to receive Vout1, CLK2, and CLK2*b*. The second clock signal shift circuit 135 can further be configured to output a third clock signal (CLK3) and an inverted third clock signal (CLK3bar) in response to Vout1, CLK2 and CLK2*b*. Specifically, the second clock signal shift circuit 135 can be configured to generate a CLK3, which oscillates between third high and low states that are different from the first high and low states, respectively, of CLK1 and also different from the second high and low states, respectively, of CLK2. Specifically, in the case of a positive charge pump CLK3 can be shifted with respect to CLK2 such that the third high and low states are higher than the second high and low states, respectively (e.g., such that the third high and low states are at 3*Vdd and 2*Vdd, respectively); whereas in the case of a negative charge pump CLK3 can be shifted with respect to CLK2 such that the third high and low states are lower than the second high and low states, respectively (e.g., such that the third high and low states are at −1*Vdd and −2*Vdd, respectively). In any case, the second clock signal shift circuit 135 can be configured so that, when CLK3 is at the third high state, CLK3*b* will be at the third low state and vice versa. The third stage 130 can be configured to receive the Vout2 from the second stage 120 at a voltage input node and also to receive both CLK3 and CLK3*b* from the second clock signal shift circuit 135. The third stage 130 can further be configured to, in response to Vout2, CLK3, and CLK3bar, output a third output voltage (Vout3) at a voltage output node. Vout3 can have a greater absolute value than Vout2. For example, in the case of a positive charge pump where Vout2 is 3*Vdd, Vout3 can be at four times the positive supply voltage level (i.e., at 4*Vdd); whereas in the case of a negative charge pump where Vout2 is at −2*Vdd, Vout3 can be at negative three times the positive supply voltage level (i.e., at −3*Vdd).

Figure 1A:
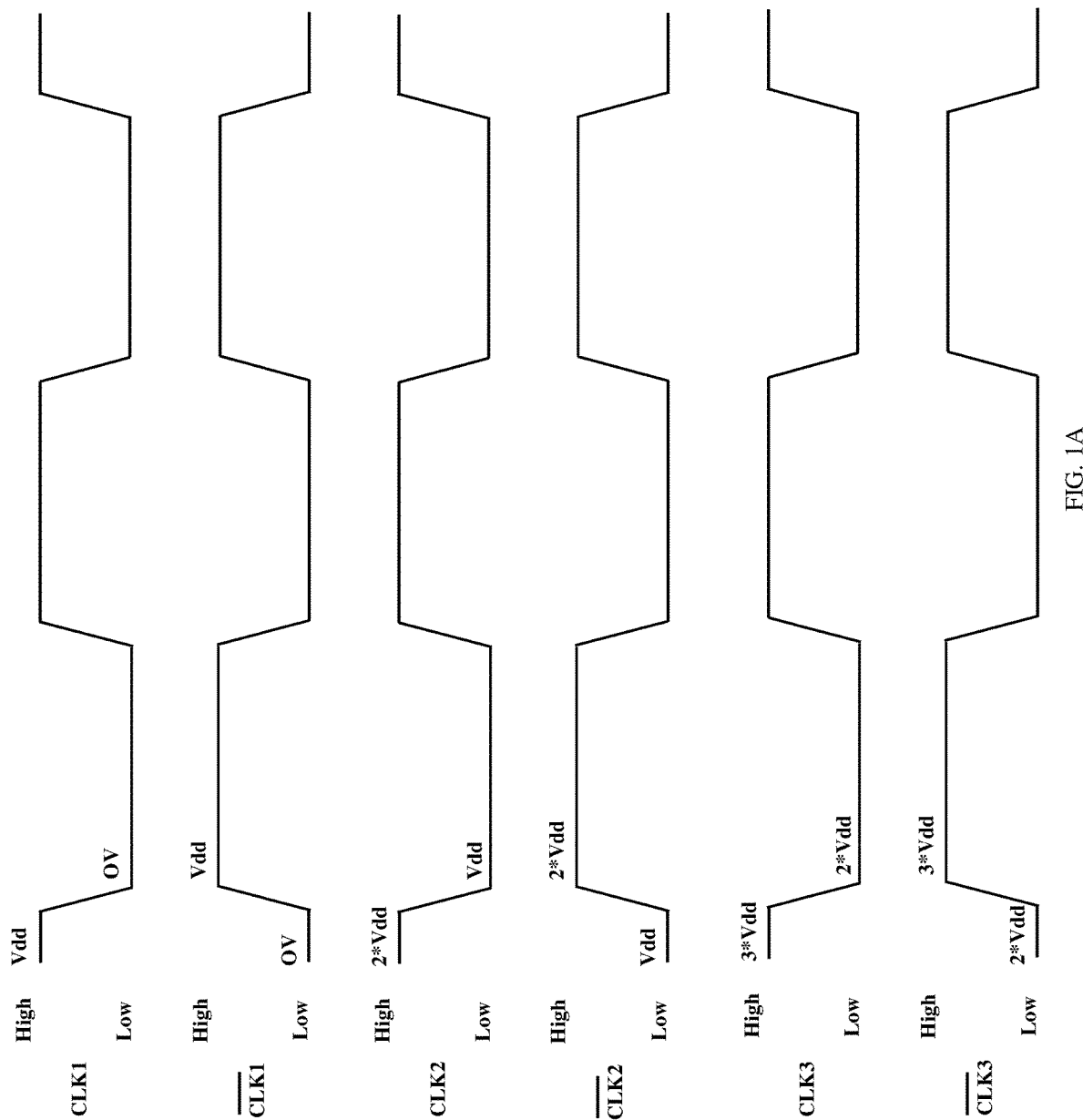
FIG. 1A is a diagram illustrating exemplary waveforms for CLK1, CLK1b, CLK2, CLK2b, CLK3 and CLK3b that can be generated and employed for use in a positive charge pump.
Figure 1B:
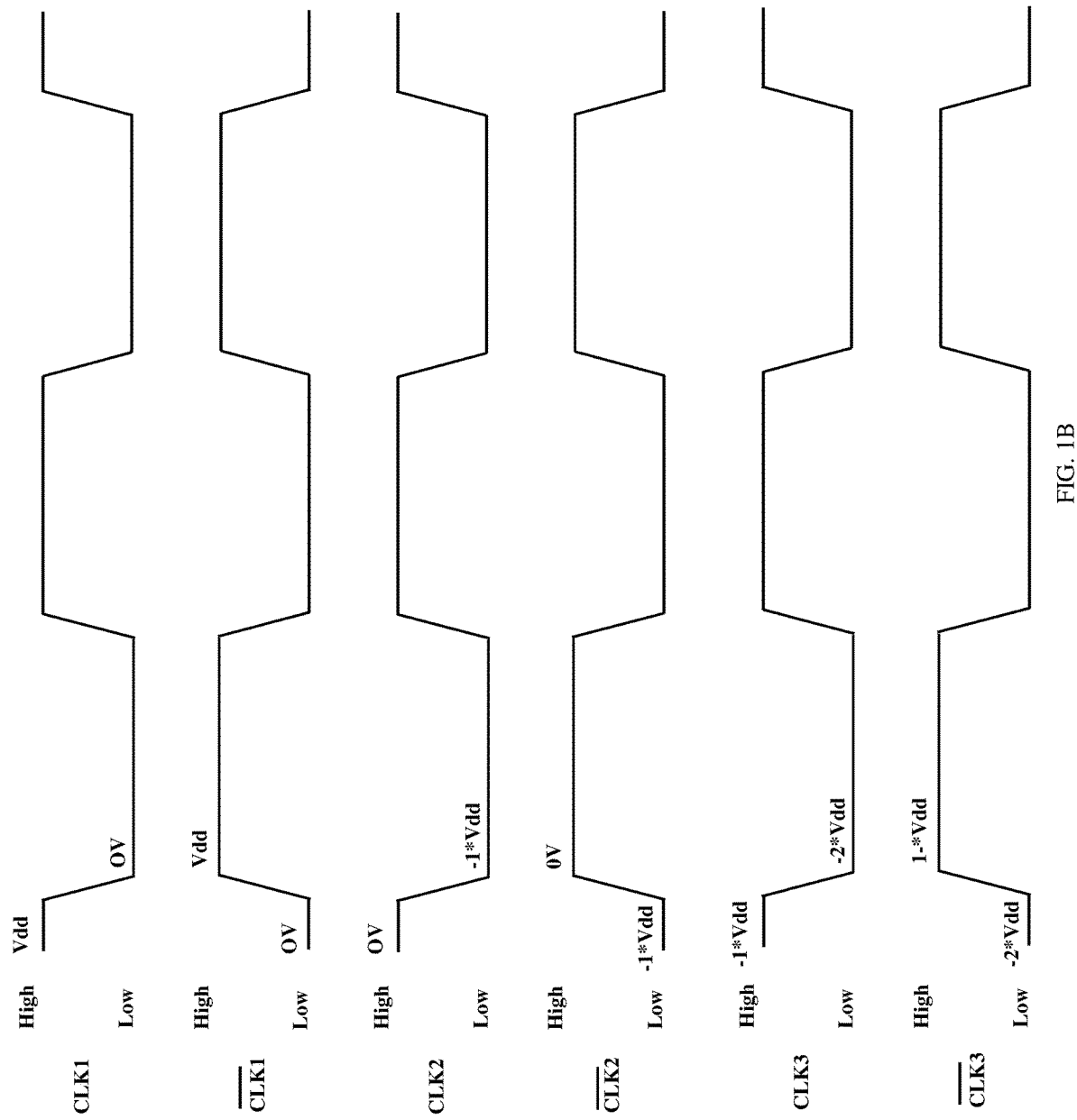
FIG. 1B is a diagram illustrating exemplary waveforms for CLK1, CLK1b, CLK2, CLK2b, CLK3 and CLK3b that can be generated and employed for use in a negative charge pump.

FIG. 1A is a diagram illustrating exemplary waveforms for CLK1, CLK1*b*, CLK2, CLK2*b*, CLK3 and CLK3*b* that can be generated and employed, as described above, for use in a positive charge pump. FIG. 1B is a diagram illustrating exemplary waveforms for CLK1, CLK1*b*, CLK2, CLK2*b*, CLK3 and CLK3*b* that can be generated and employed, as described above, for use in a negative charge pump. Thus, as illustrated, regardless of whether the charge pump is a positive or negative charge pump, the clock signals used at each stage (i.e., CLK1, CLK2, CLK3, etc.) have equal peak amplitudes. That is, the clock signals used at each stage each have essentially the same peak amplitude, which is measured as the distance between the high state and low state and which equates to the absolute value of Vdd.

Optionally, the charge pump 100 could further include a third clock signal shift circuit and a fourth stage (not shown). The third clock signal shift circuit could be configured to receive Vout2, CLK3, and CLK3*b*. The third clock signal shift circuit could further be configured to output a fourth clock signal (CLK4) and an inverted fourth clock signal (CLK4bar) in response to Vout2, CLK3 and CLK3*b*. Specifically, the third clock signal shift circuit could be configured to generate a CLK4, which oscillates between fourth high and low states. In the case of a positive charge pump CLK4 can be shifted with respect to CLK3 such that the fourth high and low states are higher than the third high and low states, respectively (e.g., such that the fourth high and low states are at 4*Vdd and 3*Vdd, respectively); whereas in the case of a negative charge pump CLK4 can be shifted with respect to CLK3 such that the fourth high and low states are lower than the third high and low states, respectively (e.g., such that the fourth high and low states at −2*Vdd and −3*Vdd, respectively). In any case, the third clock signal shift circuit could be configured so that, when CLK4 is at the fourth high state, CLK4*b* will be at the fourth low state and vice versa. The fourth stage could be configured to receive the Vout3 from the third stage 130 and both CLK4 and CLK4*b* from the third clock signal shift circuit. The fourth stage can further be configured to, in response to Vout3, CLK4, and CLK4bar, output a fourth output voltage (Vout4) with a greater absolute value than the Vout3. For example, in the case of a positive charge pump where Vout3 is 4*Vdd, Vout4 can be at five times the positive supply voltage level (i.e., at 5*Vdd); whereas in the case of a negative charge pump where Vout3 is at −3*Vdd, Vout4 can be at negative four times the positive supply voltage level (i.e., at −4*Vdd).

Optionally, the charge pump 100 could further include additional clock signal shift circuit(s) and additional stage(s) configured in essentially the same manner as described above but not shown.

In any case, the voltage output node of the final stage can be connected to an electrical load 150.

It should be noted that in each stage 110, 120, 130, etc. of the charge pump 100, the output voltage (e.g., Vout1, Vout2, Vout3, etc., respectively) will remain essentially constant as the controlling CLK signals oscillate between the high and low states. Various different charge pump stage configurations where relatively high positive or negative output voltages are essentially constantly generated at the output nodes of each stage based on an input voltage, a clock signal and an inverted clock signal are known in the art. Any of these charge pump stage configurations could be employed for the stages of the charge pump 100 disclosed herein. However, it should be understood that in the disclosed embodiments of the charge pump 100, instead of controlling all stages with the same clock signal/inverted clock signal pair (as is typically the case), only the first stage 110 is controlled by a clock signal from a clock signal generator and an inverted clock signal from an inverter 115 and all other downstream stages 120, 130, etc. are controlled by different clock signal/inverted clock signal pairs that have been shifted with respect to the clock signal/inverted clock signal pair that controlled the immediately preceding stage. By shifting the high and low states of the clock signals that control downstream stages within the multi-stage charge pump instead of using the same clock signal for all stages, the embodiments eliminate that need for series-connected or high voltage capacitors in the downstream stages and thereby reduce circuit complexity and chip area consumption.

Figure 2:
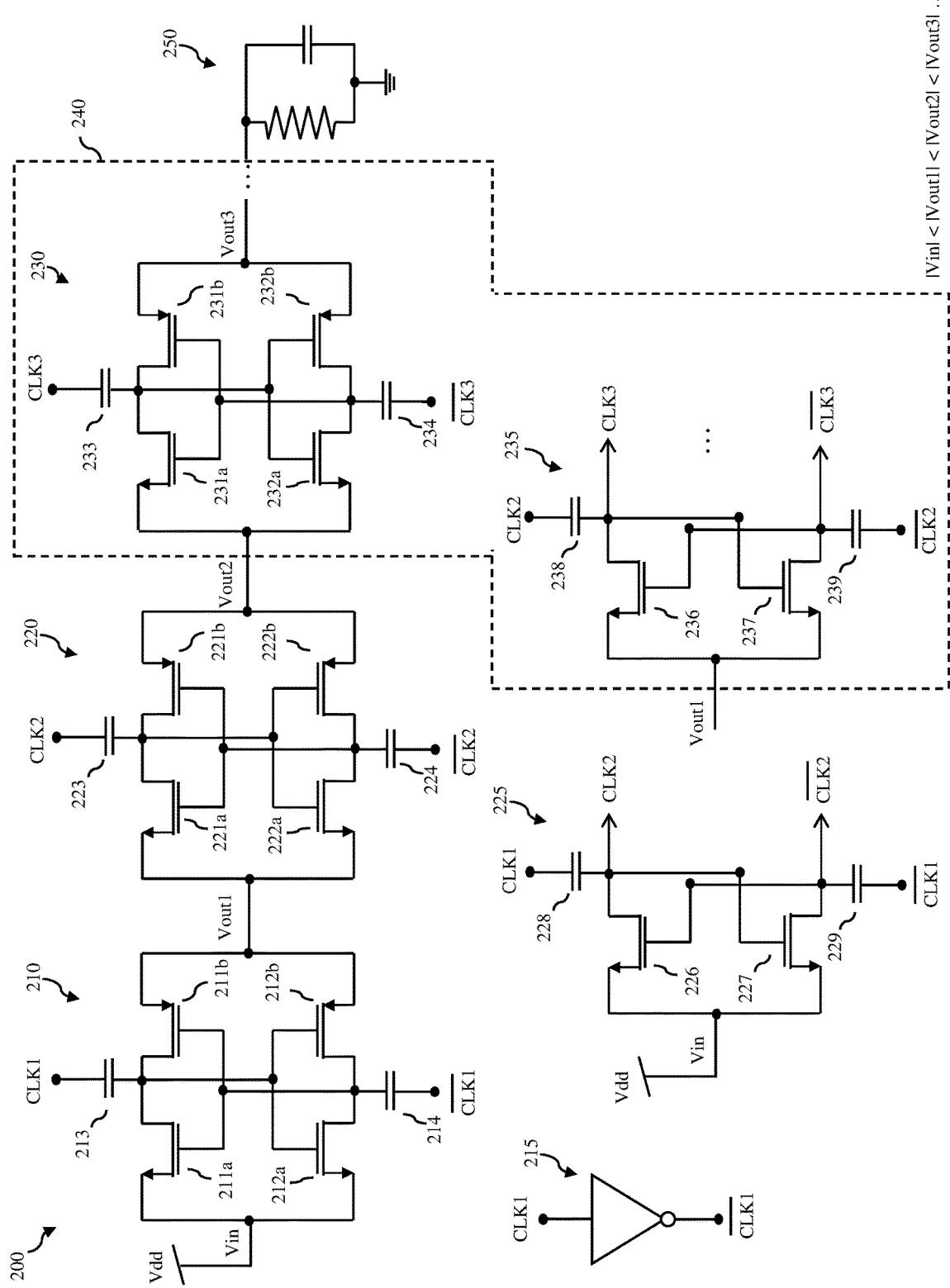
FIG. 2 is a schematic diagram illustrating a disclosed embodiment of a multi-stage positive charge pump.
Figure 2A:
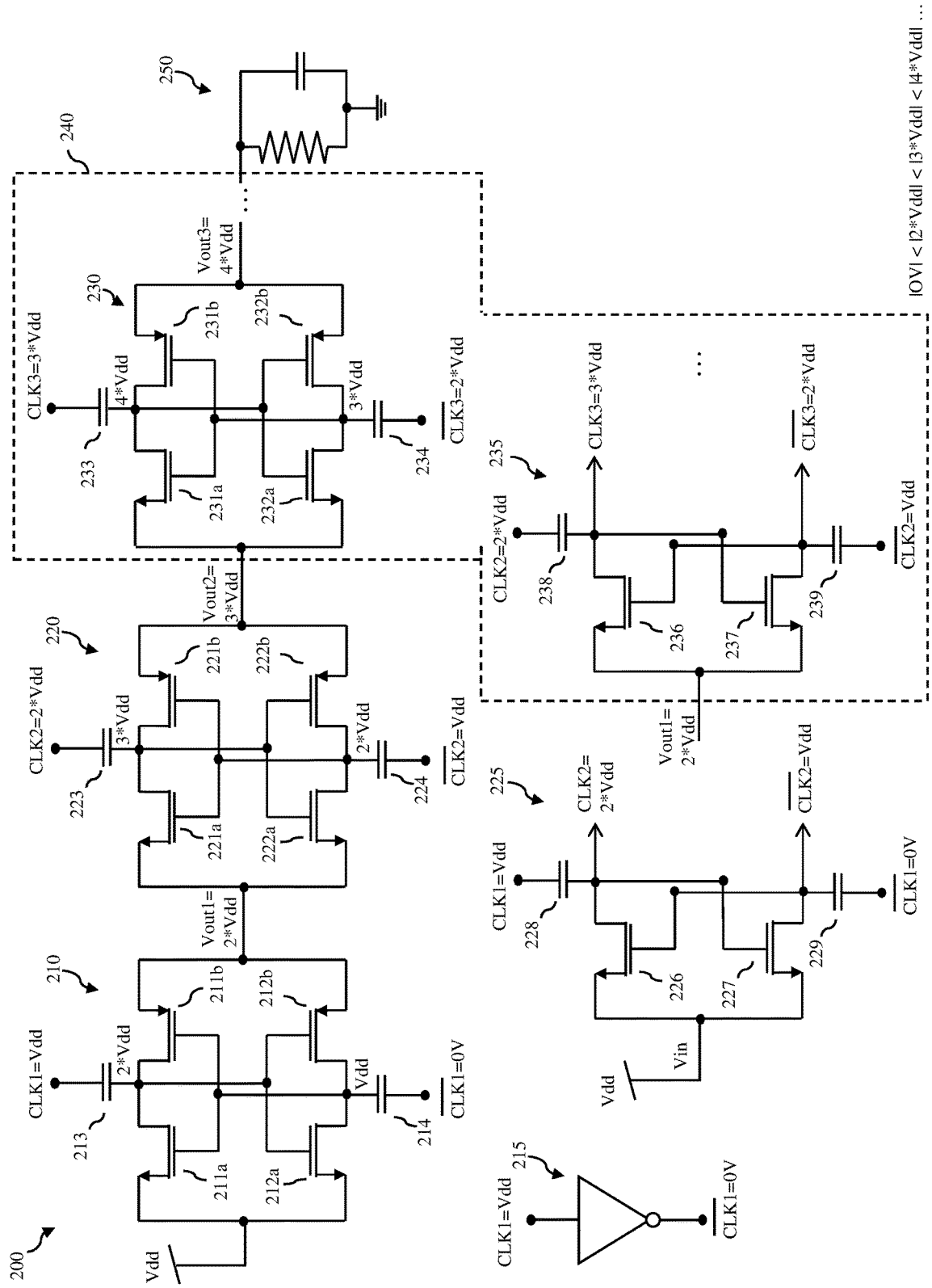
FIG. 2A is a schematic diagram illustrating operation of the multi-stage positive charge pump when CLK1 is in a high state (e.g., at Vdd)
Figure 2B:
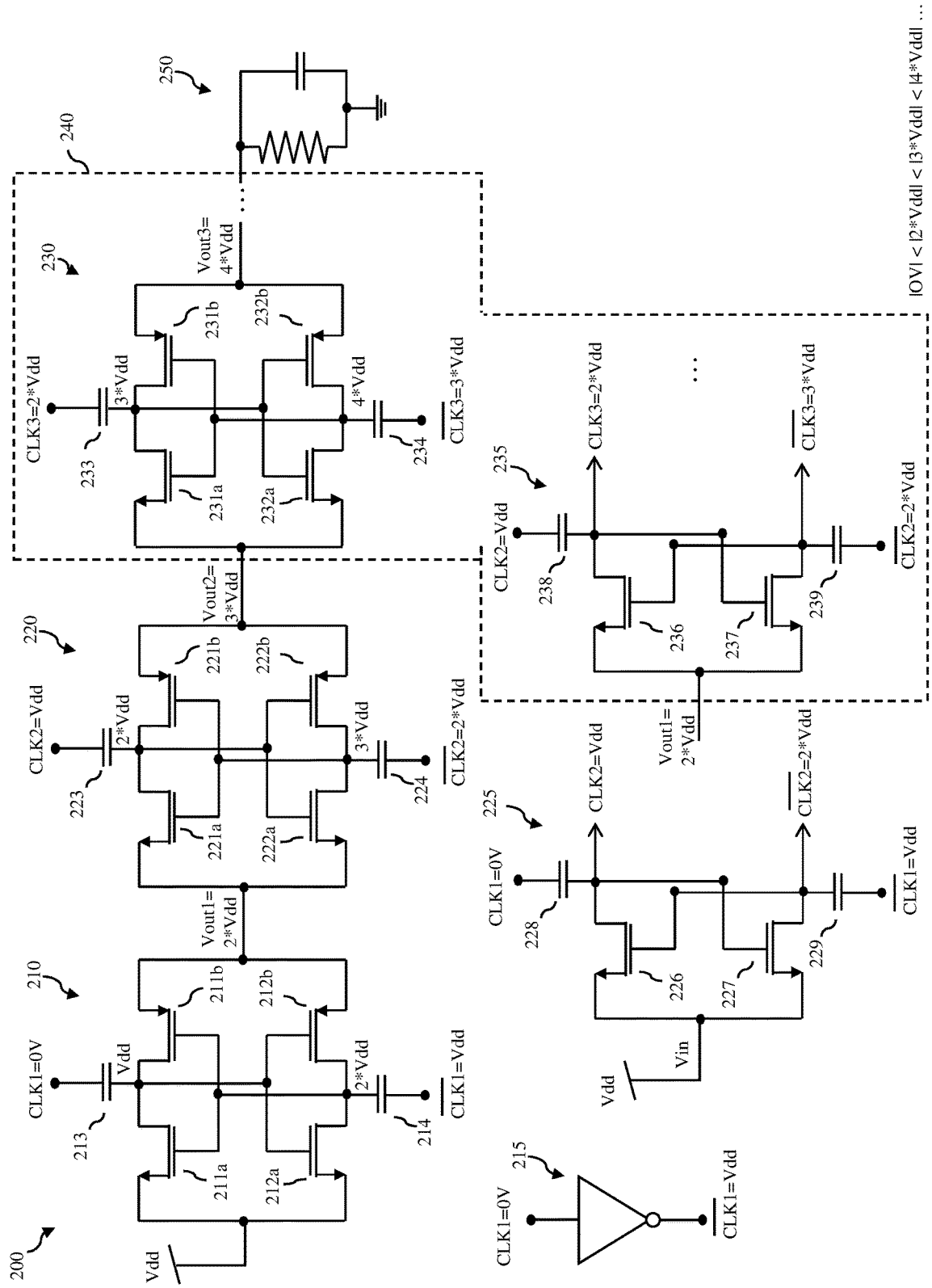
FIG. 2B is a schematic diagram illustrating operation of the multi-stage positive charge pump when CLK1 is in a low state (e.g., at 0 volts)

For purposes of illustration FIG. 2 is a schematic diagram illustrating in greater detail an exemplary positive charge pump 200. FIGS. 2A and 2B are schematic diagram further illustrating operation of the positive charge pump 200 of FIG. 2 when CLK1 is in a high state and when CLK1 is in a low state, respectively. As mentioned above, FIG. 1A is a diagram illustrating exemplary waveforms for CLK1, CLK1b, CLK2, CLK2b, CLK3 and CLK3b that can be generated and employed for use with such a positive charge pump.

More particularly, referring to FIG. 2, disclosed herein are embodiments of a multi-stage positive charge pump 200 that generates relatively high positive voltages and, particularly, positive voltages that are higher than Vdd (e.g., positive voltages of 2*Vdd, 3*Vdd, etc.).

The positive charge pump 200 can further include multiple stages including a first stage 210, a second stage 220 and, optionally, one or more additional stages (e.g., a third stage 230, a fourth stage, and so on). Each stage 210, 220, 230, etc. can include a voltage input node and a voltage output node. Each stage 210, 220, 230 can further include a first inverter, which includes a p-type field effect transistor (PFET) 211a, 221a, 231a and an n-type field effect transistor (NFET) 211b, 221b, 231b connected in series between the voltage input node and the voltage output node, and a second inverter, which similarly includes a PFET 212a, 222a, 232a and an NFET 212b, 222b, 232b also connected in series between the voltage input node and the voltage output node such that the first and second inverters are connected in parallel. The first and second inverters can further be cross-coupled. That is, the gates of the PFET and NFET 211a-211b, 221a-221b, 231a-231b of the first inverter can be connected to the junction between the PFET and NFET 212a-212b, 222a-222b, 232a-232b of the second inverter and vice versa. Each stage 210, 220, 230, etc. can further include a first capacitor 213, 223, 233 and a second capacitor 214, 224, 234. The first capacitor 213, 223, 233 can include first capacitor plates separated by a dielectric layer with one first capacitor plate connected to the junction between the PFET and NFET of the first inverter and the other first capacitor plate connected so as to receive a clock signal (as discussed in greater detail below with regard to each particular stage). Similarly, the second capacitor 214, 224, 234 can include second capacitor plates separated by a dielectric layer with one second capacitor plate connected to the junction between the PFET and NFET of the second inverter and the other second capacitor plate connected so as to receive an inverted clock signal (as discussed in greater detail below with regard to each particular stage).

The positive charge pump 200 can further include an inverter 215. The inverter 215 can be configured to receive a first clock signal (CLK1) (e.g., from a conventional clock generation circuit). CLK1 can oscillate between first high and low states. In some embodiments the first high state can be at a positive supply voltage level (e.g., at Vdd) and the first low state can be at ground (e.g., at 0 volts). The inverter 215 can further be configured to invert CLK1, outputting an inverted first clock signal (CLK1b) in response to the first clock signal. Thus, when CLK1 is at the first high state (e.g., at Vdd), CLK1b will be at the first low state (e.g., 0 volts) and vice versa.

The first stage 210 can receive a positive input voltage (Vin) at the voltage input node. Vin can be at the positive supply voltage level (e.g., at Vdd). Additionally, CLK1 can be applied to the first capacitor 213 and CLK1b can be applied to the second capacitor 214. As a result, the first output voltage (Vout1) at the voltage output node of the first stage 210 will be at two times the positive supply voltage level (i.e., at 2*Vdd) and it will remain essentially constant regardless of whether CLK1 is in the high state or low state.

The positive charge pump 200 can further include a first clock signal shift circuit 225. The first clock signal shift circuit 225 can include a pair of PFETs 226 and 227 with one PFET 226 connected between a voltage input node and a second clock signal output node and the other PFET 227 connected between the voltage input node and an inverted second clock signal output node. The gates of the PFETs 226 and 227 can be connected to the inverted second clock signal output node and the second clock signal output node, respectively. The first clock signal shift circuit 225 can further include a pair of capacitors 228 and 229 with one capacitor 228 connected between a first clock signal input node and the second clock signal output node and the other capacitor 229 connected between an inverted first clock signal input node and the inverted second clock signal output node. With this configuration, the first clock signal shift circuit 225 can receive Vin at the voltage input node, CLK1 at the first clock signal input node, and CLK1b at the inverted first clock signal input node and, in response to Vin, CLK1 and CLK1b, can output a second clock signal (CLK2) at the second clock signal output node and an inverted second clock signal (CLK2bar) at the inverted second clock signal output node. CLK2 will oscillate between second high and low states that are higher than the first high and low states, respectively, of CLK1 (e.g., will oscillate between 2*Vdd and Vdd, respectively, as opposed to Vdd and 0 volts, respectively) and, when CLK2 is at the second high state, CLK2*b* will be at the second low state and vice versa.

The second stage 220 can receive Vout1 (e.g., at 2*Vdd) from the first stage 210 at the voltage input node. Additionally, CLK2 can be applied to the first capacitor 223 and CLK2*b* can be applied to the second capacitor 224. As a result, the second output voltage (Vout2) at the voltage output node of the second stage 220 will be at three times the positive supply voltage level (i.e., at 3*Vdd) and it will remain essentially constant regardless of whether CLK2 is in the high state or low state.

Optionally, the positive charge pump 200 can further include one or more additional downstream stages and the corresponding clock signal shift circuits 240.

For example, optionally, the positive charge pump 200 can further include a second clock signal shift circuit 235 and a third stage 230. The second clock signal shift circuit 235 can include a pair of PFETs 236 and 237 with one PFET 236 connected between an input node and a third clock signal output node and the other PFET 237 connected between the input node and an inverted third clock signal output node. The gates of the PFETs 236 and 237 can be connected to the inverted third clock signal output node and the third clock signal output node, respectively. The second clock signal shift circuit 235 can further include a pair of capacitors 238 and 239 with one capacitor 238 connected between a second clock signal input node and the third clock signal output node and the other capacitor 239 connected between an inverted second clock signal input node and the inverted third clock signal output node. With this configuration, the second clock signal shift circuit 235 can receive Vout1 at the voltage input node, CLK2 at the second clock signal input node, and CLK2*b* at the inverted second clock signal input node and, in response to Vout1, CLK2 and CLK2*b*, can output a third clock signal (CLK3) at the third clock signal output node and an inverted third clock signal (CLK3bar) at the inverted third clock signal output node. CLK3 will oscillate between third high and low states that are higher than the second high and low states, respectively, of CLK2 (e.g., will oscillated between 3*Vdd and 2*Vdd, respectively) and, when CLK3 is at the third high state, CLK3*b* will be at the third low state and vice versa.

Optionally, the positive charge pump 200 could further include a third clock signal shift circuit and a fourth stage (not shown). The third clock signal shift circuit could include a pair of PFETs with one PFET connected between an input node and a fourth clock signal output node and the other PFET connected between the input node and an inverted fourth clock signal output node. The gates of the PFETs can be connected to the inverted fourth clock signal output node and the fourth clock signal output node, respectively. The third clock signal shift circuit could further include a pair of capacitors with one capacitor connected between a third clock signal input node and the fourth clock signal output node and the other capacitor connected between an inverted third clock signal input node and the inverted fourth clock signal output node. With this configuration, the third clock signal shift circuit could receive Vout2 at the voltage input node, CLK3 at the third clock signal input node, and CLK3*b* at the inverted third clock signal input node and, in response to Vout2, CLK3 and CLK3*b*, can output a fourth clock signal (CLK4) at the fourth clock signal output node and an inverted fourth clock signal (CLK4bar) at the inverted fourth clock signal output node. CLK4 will oscillate between fourth high and low states that are higher than the third high and low states, respectively, of CLK3 (e.g., will oscillate between 4*Vdd and 3*Vdd, respectively) and, when CLK4 is at the fourth high state, CLK4*b* will be at the fourth low state and vice versa.

Optionally, the positive charge pump 200 could further include additional clock signal shift circuit(s) and additional stage(s) configured in essentially the same manner as described above but not shown. In any case, the voltage output node of the final stage can be connected to an electrical load 250. The electrical load 250 can be, for example, a resistor and capacitor connected in parallel between the voltage output node of the final stage and ground. Alternatively, the electrical load 250 could be any other suitable electrical load that consumes power or energy.

It should be noted that in prior art positive charge pumps in which all stages are controlled by the same clock signal/inverted clock signal pair, each capacitor in each downstream stage would have to be higher voltage capacitor or would have to include a larger series combination of capacitors than the corresponding capacitor in a previous stage in order to achieve the desired voltage outputs. For example, absent the clock signal shift circuits, the capacitors 223 and 224 of the second stage 220 would otherwise have to be higher voltage capacitors or would have to be larger series combinations of capacitors than the capacitors 213 and 214 of the first stage 210; the capacitors 233 and 234 of the third stage 230 would otherwise have to be higher voltage capacitors or would have to be larger series combinations of capacitors than the capacitors 223 and 224 of the second stage 220; and so on. However, by shifting the high and low states of the clock signals that control downstream stages within the positive charge pump 200 instead of using the same clock signal for all stages, the structure shown in FIG. 2 eliminates that need for series-connected or high voltage capacitors in the downstream stages and thereby reduces circuit complexity and chip area consumption.

Figure 3:
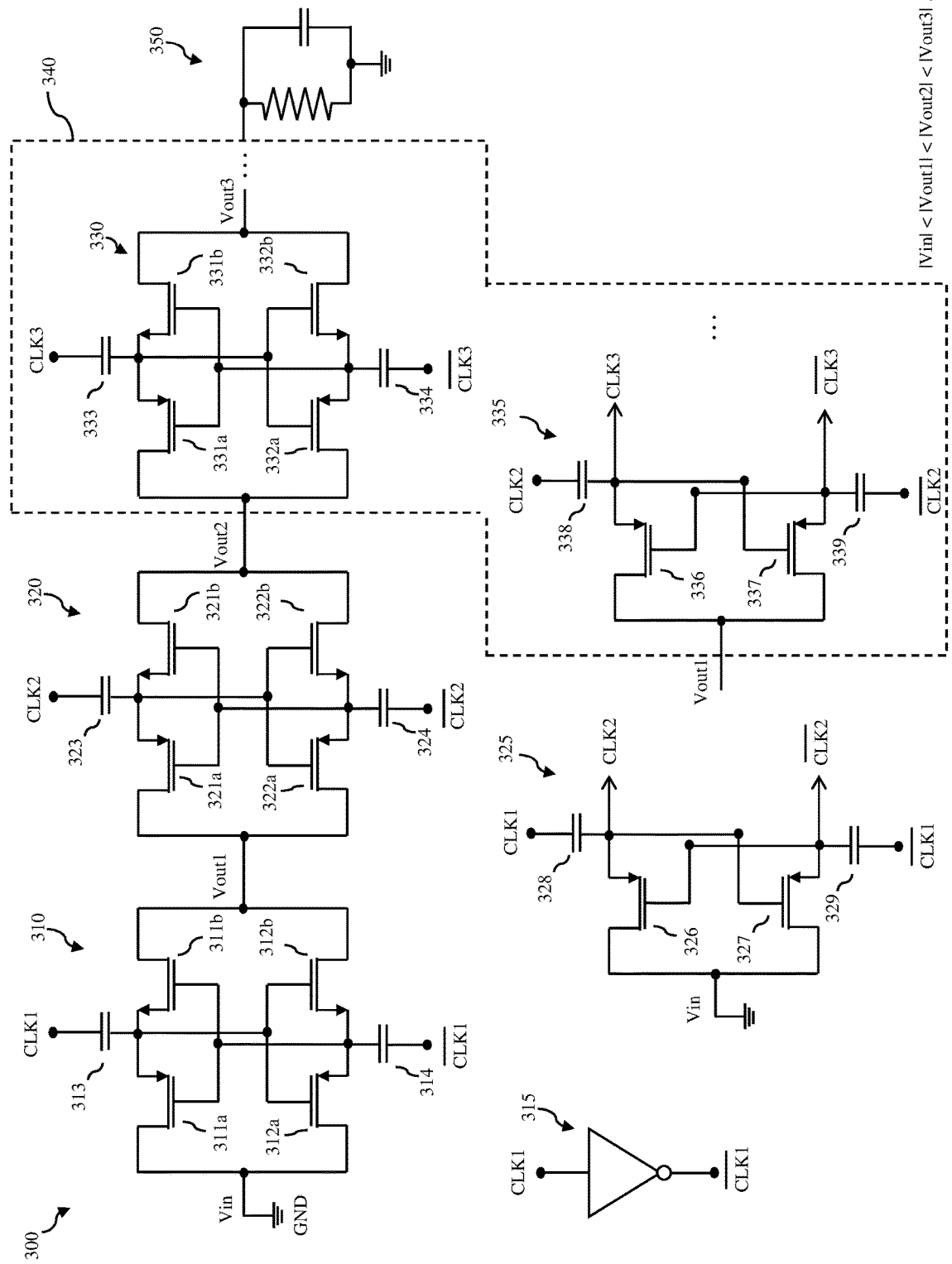
FIG. 3 is a schematic diagram illustrating a disclosed embodiment of a multi-stage negative charge pump.
Figure 3A:
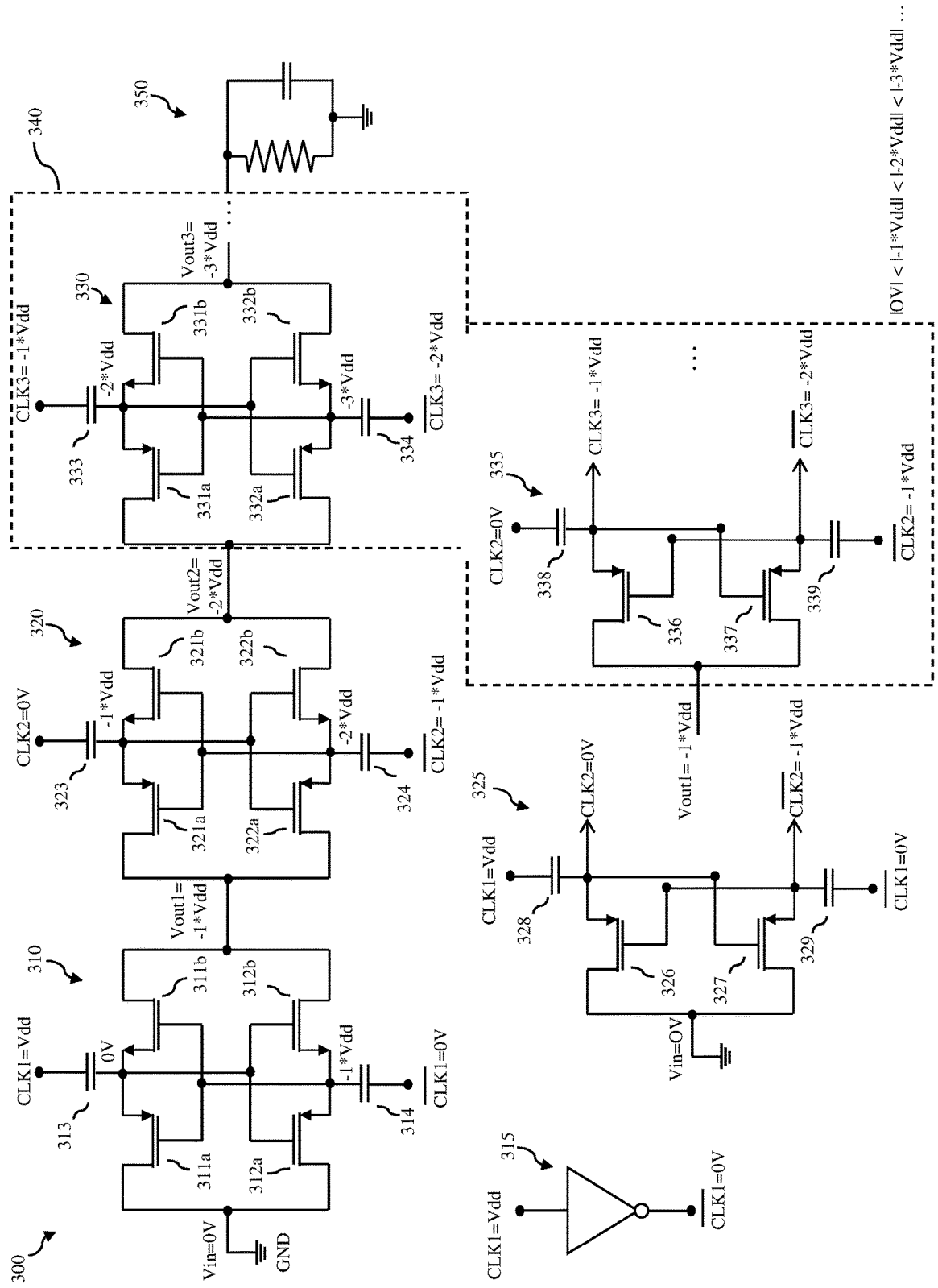
FIG. 3A is a schematic diagram illustrating operation of the multi-stage negative charge pump when CLK1 is in a high state (e.g., at Vdd)
Figure 3B:
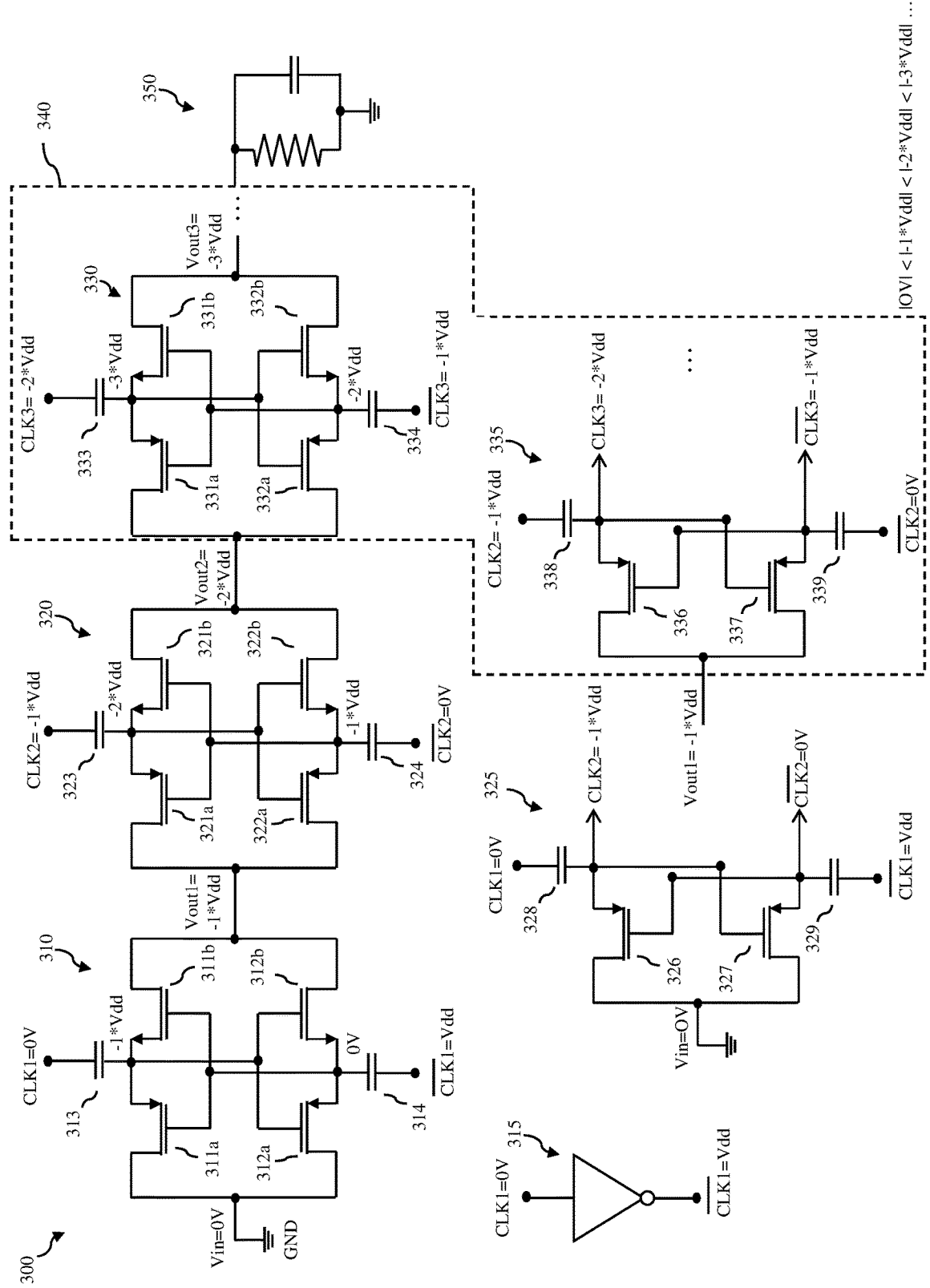
FIG. 3B is a schematic diagram illustrating operation of the multi-stage negative charge pump when CLK1 is in a low state (e.g., at 0 volts).

For purposes of illustration FIG. 3 is a schematic diagram illustrating in greater detail an exemplary negative charge pump 300. FIGS. 3A and 3B are schematic diagram further illustrating operation of the negative charge pump 300 of FIG. 3 when CLK1 is in a high state and when CLK1 is in a low state, respectively. As mentioned above, FIG. 1B is a diagram illustrating exemplary waveforms for CLK1, CLK1*b*, CLK2, CLK2*b*, CLK3 and CLK3*b* that can be generated and employed for use with such a negative charge pump.

More particularly, referring to FIG. 3, disclosed herein are embodiments of a multi-stage negative charge pump 300 that generates relatively high negative voltages (e.g., negative voltage of −1*Vdd, −2*Vdd, etc.).

The negative charge pump 300 can further include multiple stages including a first stage 310, a second stage 320 and, optionally, one or more additional stages (e.g., a third stage 330, a fourth stage, and so on). Each stage 310, 320, 330, etc. can include a voltage input node and a voltage output node. Each stage 310, 220, 330 can further include a first inverter, which includes an NFET 311*a*, 321*a*, 331*a* and PFET 311*b*, 321*b*, 331*b* connected in series between the voltage input node and the voltage output node, and a second inverter, which similarly includes an NFET 312*a*, 322*a*, 332*a* and a PFET 312*b*, 322*b*, 332*b* also connected in series between the voltage input node and the voltage output node such that the first and second inverters are connected in parallel. The first and second inverters can further be cross-coupled. That is, the gates of the NFET and PFET 311*a*-311*b*, 321*a*-321*b*, 331*a*-231*b* of the first inverter can be connected to the junction between the NFET and PFET 312*a*-312*b*, 322*a*-322*b*, 332*a*-332*b* of the second inverter and vice versa. Each stage 310, 320, 330, etc. can further include a first capacitor 313, 323, 333 and a second capacitor 314, 324, 334. The first capacitor 313, 323, 333 can include first capacitor plates separated by a dielectric layer with one first capacitor plate connected to the junction between the NFET and PFET of the first inverter and the other first capacitor plate connected so as to receive a clock signal (as discussed in greater detail below with regard to each particular stage). Similarly, the second capacitor 314, 324, 334 can include second capacitor plates separated by a dielectric layer with one second capacitor plate connected to the junction between the NFET and PFET of the second inverter and the other second capacitor plate connected so as to receive an inverted clock signal (as discussed in greater detail below with regard to each particular stage).

The negative charge pump 300 can further include an inverter 315. The inverter 315 can be configured to receive a first clock signal (CLK1) (e.g., from a conventional clock generation circuit). CLK1 can oscillate between first high and low states. In some embodiments the first high state can be at a positive supply voltage level (e.g., at Vdd) and the first low state can be at ground (e.g., at 0 volts). The inverter 315 can further be configured to invert CLK1, outputting an inverted first clock signal (CLK1b) in response to the first clock signal. Thus, when CLK1 is at the first high state (e.g., at Vdd), CLK1b will be at the first low state (e.g., 0 volts) and vice versa.

The first stage 310 can receive an input voltage (Vin) of, for example, 0 volts at the voltage input node. Additionally, CLK1 can be applied to the first capacitor 313 and CLK1b can be applied to the second capacitor 314. As a result, the first output voltage (Vout1) at the voltage output node of the first stage 310 will be at negative one times the positive supply voltage level (i.e., at −1*Vdd) and it will remain essentially constant regardless of whether CLK1 is in the high state or low state.

The negative charge pump 300 can further include a first clock signal shift circuit 325. The first clock signal shift circuit 325 can include a pair of NFETs 326 and 327 with one NFET 326 connected between a voltage input node and a second clock signal output node and the other NFET 327 connected between the voltage input node and an inverted second clock signal output node. The gates of the NFETs 326 and 327 can be connected to the inverted second clock signal output node and the second clock signal output node, respectively. The first clock signal shift circuit 325 can further include a pair of capacitors 328 and 329 with one capacitor 328 connected between a first clock signal input node and the second clock signal output node and the other capacitor 329 connected between an inverted first clock signal input node and the inverted second clock signal output node. With this configuration, the first clock signal shift circuit 325 can receive Vin at the voltage input node, CLK1 at the first clock signal input node, and CLK1b at the inverted first clock signal input node and, in response to Vin, CLK1 and CLK1b, can output a second clock signal (CLK2) at the second clock signal output node and an inverted second clock signal (CLK2bar) at the inverted second clock signal output node. CLK2 will oscillate between second high and low states that are lower than the first high and low states, respectively, of CLK1 (e.g., will oscillate between 0 volts and −1*Vdd, respectively, as opposed to Vdd and 0 volts, respectively) and, when CLK2 is at the second high state, CLK2b will be at the second low state and vice versa.

The second stage 320 can receive Vout1 (e.g., at −1*Vdd) from the first stage 310 at the voltage input node. Additionally, CLK2 can be applied to the first capacitor 323 and CLK2b can be applied to the second capacitor 324. As a result, the second output voltage (Vout2) at the voltage output node of the second stage 320 will be at negative two times the positive supply voltage level (i.e., at −2*Vdd) and it will remain essentially constant regardless of whether CLK2 is in the high state or low state.

Optionally, the negative charge pump 300 can further include one or more additional downstream stages and the corresponding clock signal shift circuits 340.

For example, optionally, the negative charge pump 300 can further include a second clock signal shift circuit 335 and a third stage 330. The second clock signal shift circuit 335 can include a pair of NFETs 336 and 337 with one NFET 336 connected between an input node and a third clock signal output node and the other NFET 337 connected between the input node and an inverted third clock signal output node. The gates of the NFETs 336 and 337 can be connected to the inverted third clock signal output node and the third clock signal output node, respectively. The second clock signal shift circuit 335 can further include a pair of capacitors 338 and 339 with one capacitor 338 connected between a second clock signal input node and the third clock signal output node and the other capacitor 339 connected between an inverted second clock signal input node and the inverted third clock signal output node. With this configuration, the second clock signal shift circuit 335 can receive Vout1 at the voltage input node, CLK2 at the second clock signal input node, and CLK2b at the inverted second clock signal input node and, in response to Vout1, CLK2 and CLK2b, can output a third clock signal (CLK3) at the third clock signal output node and an inverted third clock signal (CLK3bar) at the inverted third clock signal output node. CLK3 will oscillate between third high and low states (e.g., can oscillate between −1*Vdd and −2*Vdd, respectively) that are lower than the second high and low states, respectively, of CLK2 and, when CLK3 is at the third high state, CLK3b will be at the third low state and vice versa.

Optionally, the negative charge pump 300 could further include a third clock signal shift circuit and a fourth stage (not shown). The third clock signal shift circuit could include a pair of NFETs with one NFET connected between an input node and a fourth clock signal output node and the other NFET connected between the input node and an inverted fourth clock signal output node. The gates of the NFETs can be connected to the inverted fourth clock signal output node and the fourth clock signal output node, respectively. The third clock signal shift circuit could further include a pair of capacitors with one capacitor connected between a third clock signal input node and the fourth clock signal output node and the other capacitor connected between an inverted third clock signal input node and the inverted fourth clock signal output node. With this configuration, the third clock signal shift circuit could receive Vout2 at the voltage input node, CLK3 at the third clock signal input node, and CLK3b at the inverted third clock signal input node and, in response to Vout2, CLK3 and CLK3b, can output a fourth clock signal (CLK4) at the fourth clock signal output node and an inverted fourth clock signal (CLK4bar) at the inverted fourth clock signal output node. CLK4 will oscillate between fourth high and low states that are higher than the third high and low states, respectively, of CLK3 (e.g., will oscillate between −2*Vdd and −3*Vdd, respectively) and, when CLK4 is at the fourth high state, CLK4b will be at the fourth low state and vice versa.

Optionally, the negative charge pump 300 could further include additional clock signal shift circuit(s) and additional stage(s) configured in essentially the same manner as described above but not shown. In any case, the voltage output node of the final stage can be connected to an electrical load 350. The electrical load 350 can be, for example, a resistor and capacitor connected in parallel between the voltage output node of the final stage and ground. Alternatively, the electrical load 350 could be any other suitable electrical load that consumes power or energy.

It should be noted that in prior art negative charge pumps in which all stages are controlled by the same clock signal/inverted clock signal pair, each capacitor in each downstream stage would have to be higher voltage capacitor or would have to include a larger series combination of capacitors than the corresponding capacitor in a previous stage in order to achieve the desired voltage outputs. For example, absent the clock signal shift circuits, the capacitors 323 and 324 of the second stage 320 would otherwise have to be higher voltage capacitors or would have to be larger series combinations of capacitors than the capacitors 313 and 314 of the first stage 310; the capacitors 333 and 334 of the third stage 330 would otherwise have to be higher voltage capacitors or would have to be larger series combinations of capacitors than the capacitors 323 and 324 of the second stage 320; and so on. However, by shifting the high and low states of the clock signals that control downstream stages within the negative charge pump 300 instead of using the same clock signal for all stages, the structure shown in FIG. 3 eliminates that need for series-connected or high voltage capacitors in the downstream stages and thereby reduces circuit complexity and chip area consumption.

In the above-described multi-stage charge pump embodiments, the total number of capacitors, including capacitors within the stages and within the clock signal shift circuits (but excluding load capacitance) can be calculated using the following equation:

Total No. of Capacitors=2(2n−1), wherein n is equal to the total number of stages within the multi-stage charge pump. This is significantly less than the total number of capacitors seen in prior art where, for example, a two-stage charge pump could require ten capacitors, a three-stage charge pump could require twenty-eight capacitors, a four stage charge pump could require sixty capacitors, and so on. In view of the foregoing, advantages associated with each of the above disclosed multi-stage charge pump embodiments described above and illustrated in the figures include, but are not limited to, implementation using low voltage capacitors and/or transistors, implementation using only two low voltage capacitors (as opposed to two high voltage capacitors or two series combinations of capacitors) in each stage for reduced area consumption, implementation without the need to bias internal capacitor nodes of series combinations of capacitors in each stage for improved reliability, and passing of safe operating area (SOA) specifications.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A charge pump comprising:
a first stage configured to receive an input voltage and a first clock signal with first high and low states and further configured to output a first output voltage;
a clock signal shift circuit configured to receive the input voltage and the first clock signal and further configured to output a second clock signal with second high and low states that are level-shifted in a same specific direction relative to the first high and low states, respectively;
a second stage configured to receive the first output voltage and the second clock signal and further configured to output a second output voltage with a greater absolute value than the first output voltage; and
a second clock signal shift circuit configured to receive the first output voltage and the second clock signal and further configured to output a third clock signal with third high and low states that are level-shifted in the same specific direction relative to the second high and low states, respectively, of the second clock signal; and
a third stage configured to receive the second output voltage and the third clock signal and further configured to output a third output voltage with a greater absolute value than the second output voltage.

2. The charge pump of claim 1, wherein the first clock signal and the second clock signal have equal peak amplitudes.

3. The charge pump of claim 1, wherein the first high and low states of the first clock signal are at a positive supply voltage level and at 0 volts, respectively.

4. The charge pump of claim 3, wherein the charge pump comprises a positive charge pump and wherein the second high and low states of the second clock signal are at two times the positive supply voltage level and at the positive supply voltage level, respectively.

5. The charge pump of claim 3, wherein the charge pump comprises a negative charge pump and wherein the second high and low states of the second clock signal are at 0 volts and at negative one times the positive supply voltage level, respectively.

6. A charge pump comprising:
an inverter configured to receive a first clock signal with first high and low states and further configured to output an inverted first clock signal;
a first stage configured to receive a positive input voltage, the first clock signal, and the inverted first clock signal and further configured to output a first positive output voltage that is greater than the positive input voltage;
a clock signal shift circuit configured to receive the positive input voltage, the first clock signal, and the inverted first clock signal and further configured to output a second clock signal with second high and low states that are level-shifted up relative to the first high and low states, respectively, and to output an inverted second clock signal; and
a second stage configured to receive the first positive output voltage, the second clock signal, and the inverted second clock signal and further configured to output a second positive output voltage that is greater than the first positive output voltage,
wherein the first high and low states of the first clock signal are at a positive supply voltage level and at 0 volts, respectively, and
wherein the second high and low states of the second clock signal are at two times the positive supply voltage level and at the positive supply voltage level, respectively.

7. The charge pump of claim 6,
wherein each stage comprises: an input node; an output node; a first inverter; a second inverter; a first capacitor; and a second capacitor,
wherein the first inverter and the second inverter each comprise a p-type field effect transistor connected in series with an n-type field effect transistor between the input node and the output node such that the first inverter and the second inverter are connected in parallel,
wherein the first inverter and the second inverter are further cross-coupled,
wherein the first capacitor comprises: one first capacitor plate connected to a junction between the p-type field effect transistor and the n-type field effect transistor of the first inverter; and another first capacitor plate connected to receive a clock signal, and
wherein the second capacitor comprises: one second capacitor plate connected to a junction between the p-type field effect transistor and the n-type field effect transistor of the second inverter; and another second capacitor plate connected to receive an inverted clock signal.

8. The charge pump of claim 6, wherein the first clock signal and the second clock signal have equal peak amplitudes.

9. The charge pump of claim 6, wherein the first positive output voltage is two times the positive supply voltage level and wherein the second positive output voltage is three times the positive supply voltage level.

10. The charge pump of claim 9, further comprising:
a second clock signal shift circuit configured to receive the first positive output voltage, the second clock signal, and the inverted second clock signal, and further configured to output a third clock signal with third high and low states that are level-shifted up relative to the second high and low states, respectively, of the second clock signal and to output an inverted third clock signal; and
a third stage configured to receive the second positive output voltage, the third clock signal, and the inverted third clock signal and further configured to output a third positive output voltage greater than the second positive output voltage.

11. The charge pump of claim 10, wherein the third high and low states of the third clock signal are at three times the positive supply voltage level and at two times the positive supply voltage level, respectively, and wherein the third positive output voltage is four times the positive supply voltage level.

12. A charge pump comprising:
an inverter configured to receive a first clock signal with first high and low states and further configured to output an inverted first clock signal;
a first stage configured to receive an input voltage of 0 volts, the first clock signal, and the inverted first clock signal and further configured to output a first negative output voltage;
a clock signal shift circuit configured to receive the input voltage of 0 volts, the first clock signal, and the inverted first clock signal and further configured to output a second clock signal with second high and low states that are level-shifted down relative to the first high and low states, respectively, and to output an inverted second clock signal; and
a second stage configured to receive the first negative output voltage, the second clock signal, and the inverted second clock signal and further configured to output a second negative output voltage that is less than the first negative output voltage,
wherein the first high and low states of the first clock signal are at a positive supply voltage level and at 0 volts, respectively,
wherein the second high and low states of the second clock signal are at 0 volts and negative one times the positive supply voltage level, respectively, and
wherein the first negative output voltage is negative one times the positive supply voltage level and wherein the second negative output voltage is negative two times the positive supply voltage level.

13. The charge pump of claim 12,
wherein each stage comprises: an input node; an output node; a first inverter; a second inverter; a first capacitor; and a second capacitor,
wherein the first inverter and the second inverter each comprise an n-type field effect transistor connected in series with a p-type field effect transistor between the input node and the output node such that the first inverter and the second inverter are connected in parallel,
wherein the first inverter and the second inverter are further cross-coupled,
wherein the first capacitor comprises: one first capacitor plate connected to a junction between the n-type field effect transistor and the p-type field effect transistor of the first inverter; and another first capacitor plate connected to receive a clock signal, and wherein the second capacitor comprises: one second capacitor plate connected to a junction between the n-type field effect transistor and the p-type field effect transistor of the second inverter; and another second capacitor plate connected to receive an inverted clock signal.

14. The charge pump of claim 12, wherein the first clock signal and the second clock signal have equal peak amplitudes.

15. The charge pump of claim 12, further comprising:
a second clock signal shift circuit configured to receive the first negative output voltage, the second clock signal, and the inverted second clock signal, and further configured to output a third clock signal with third high and low states that are level-shifted down relative to the second high and low states, respectively, of the second clock signal and to output an inverted third clock signal; and
a third stage configured to receive the second negative output voltage, the third clock signal, and the inverted third clock signal and further configured to output a third negative output voltage that is less than the second negative output voltage,
wherein the third high and low states of the third clock signal are at negative one times the positive supply voltage level and at negative two times the positive supply voltage level, respectively, and
wherein the third negative output voltage is negative three times the positive supply voltage level.

\* \* \* \* \*